US012743471B1

(12) United States Patent
Gordon et al.

(10) Patent No.: US 12,743,471 B1
(45) Date of Patent: Sep. 22, 2026

(54) CLUSTERING IN A STORAGE SYSTEM

(71) Applicant: VAST DATA LTD., Tel Aviv (IL)

(72) Inventors: Eyal Gordon, Tel Aviv (IL); Asaf Levy, Tel Aviv (IL); Eitan Yaakobi, Tel Aviv (IL); Sagi Grimberg, Kfar-Saba (IL); Roman Veinbrand, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 19/066,071

(22) Filed: Feb. 27, 2025

(51) Int. Cl.
*G06F 16/90* (2019.01)
*G06F 16/906* (2019.01)

(52) U.S. Cl.
CPC .................................. *G06F 16/906* (2019.01)

(58) Field of Classification Search
CPC ............................... G06F 16/906; G06F 18/23
See application file for complete search history.

(56) References Cited

U.S. PATENT DOCUMENTS 10,331,681 B1 * 6/2019 Chen ..................... G06F 16/285
11,630,852 B1 * 4/2023 Mondloch ............. G06F 16/285 707/737
2015/0213375 A1 * 7/2015 Malewicz ............. G06F 16/137 707/737
2025/0315447 A1 * 10/2025 Puttagunta ........... G06F 16/285

* cited by examiner

*Primary Examiner* — Kristopher Andersen
(74) *Attorney, Agent, or Firm* — Reches Patents

(57) ABSTRACT

A method for clustering and re-clustering in a storage system, the method includes (a) randomly selecting a first number of sets of clusters of a vast number of clusters stored in the storage system; wherein the vast number of clusters comprises first clusters and second clusters, wherein each first cluster is generated regardless of similarities between members of the first cluster, wherein each second cluster is generated based on at least similarities between members of the second cluster; (b) for each set of clusters, calculating by a processing circuit, a set re-clustering score that is based on (i) a sparseness measure of each clusters of the set of clusters, and (ii) one or more inter-clusters relationship measure indicative of spatial relationships between the clusters of the set of clusters; (c) identifying, by the processing circuit and based on set re-clustering scores of the first number of sets of clusters, one or more sets of clusters to be re-clustered; (d) re-clustering each one or more sets of clusters to provide updated second clusters; and (e) storing the updated second clusters in the storage system.

16 Claims, 6 Drawing Sheets

20

Figure 3:
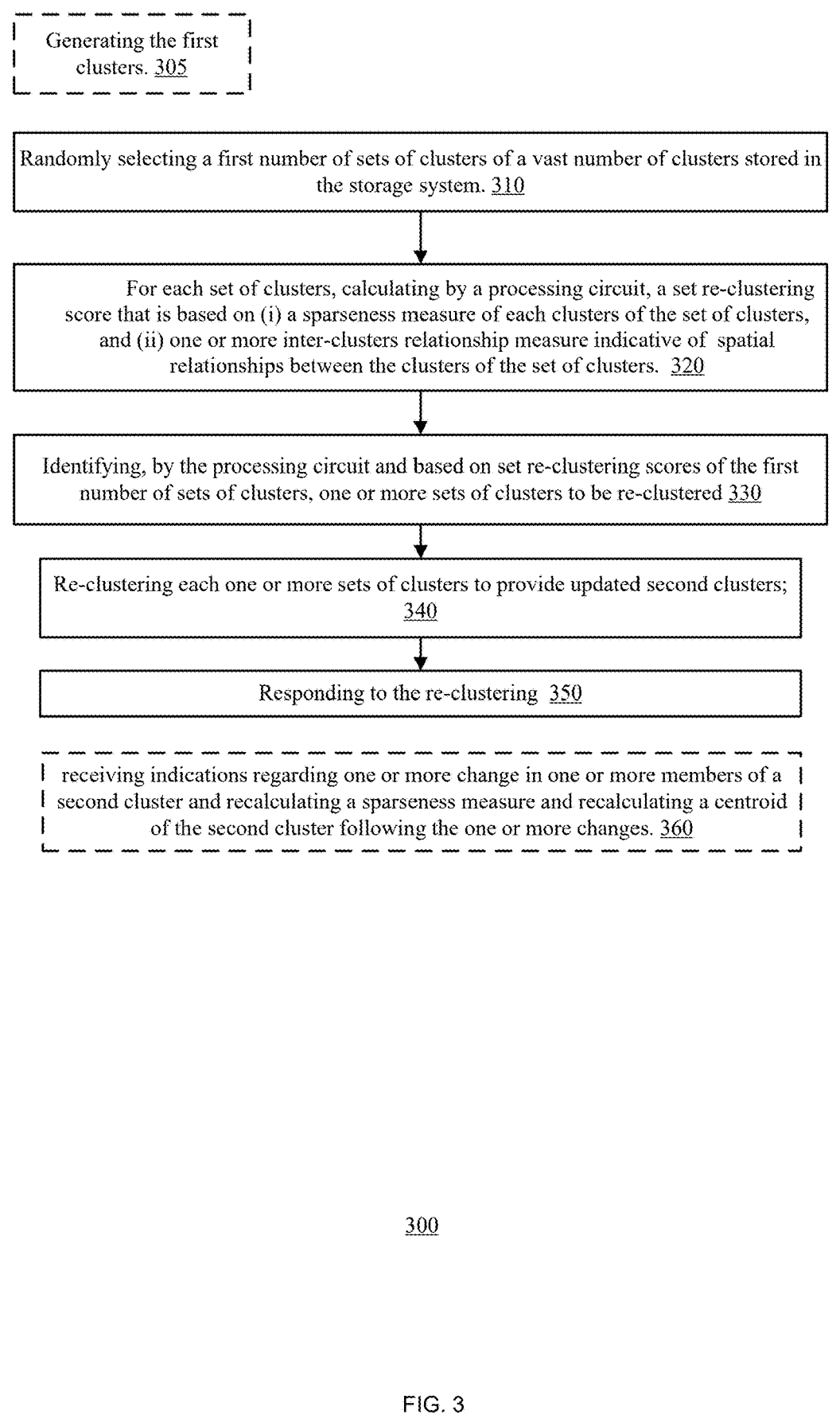

Generating the first clusters. 305

Randomly selecting a first number of sets of clusters of a vast number of clusters stored in the storage system. 310

For each set of clusters, calculating by a processing circuit, a set re-clustering score that is based on (i) a sparseness measure of each clusters of the set of clusters, and (ii) one or more inter-clusters relationship measure indicative of spatial relationships between the clusters of the set of clusters. 320

Identifying, by the processing circuit and based on set re-clustering scores of the first number of sets of clusters, one or more sets of clusters to be re-clustered 330

Re-clustering each one or more sets of clusters to provide updated second clusters; 340

Responding to the re-clustering 350 receiving indications regarding one or more change in one or more members of a second cluster and recalculating a sparseness measure and recalculating a centroid of the second cluster following the one or more changes. 360

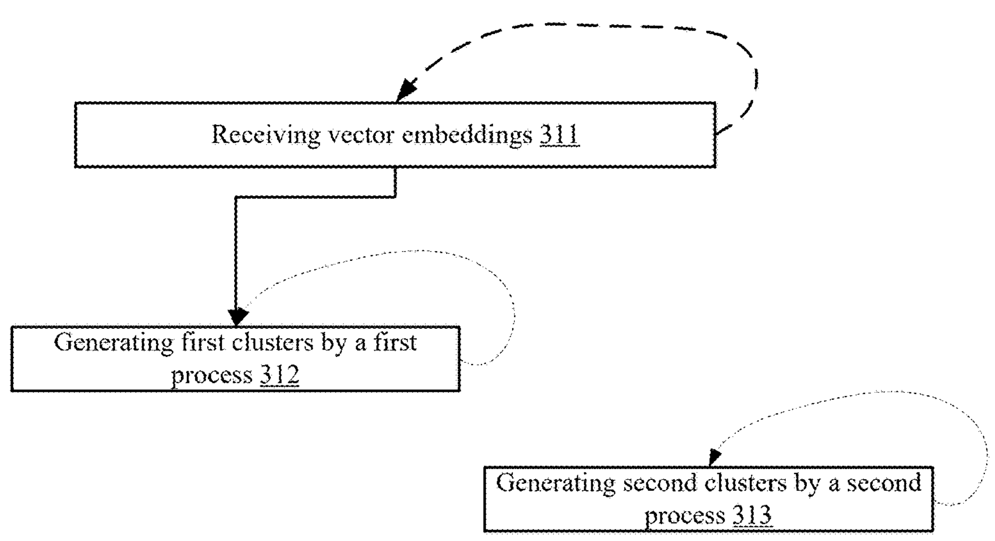
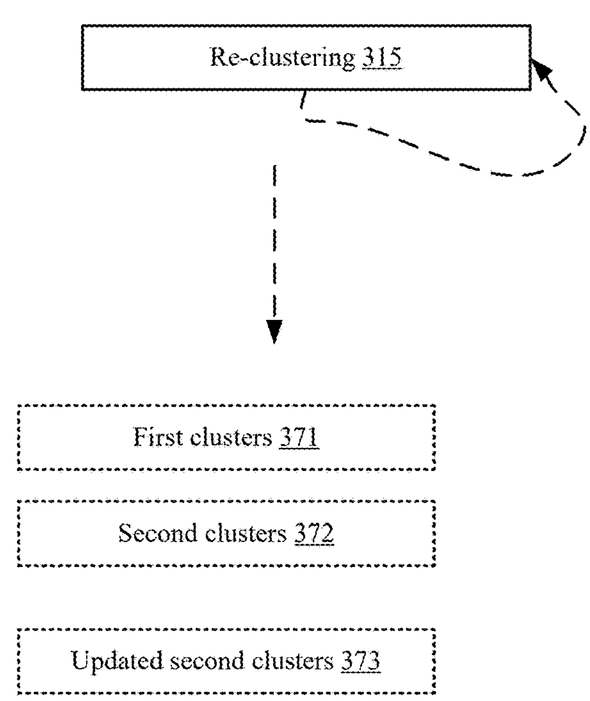
380
FIG. 4

Figure 5:
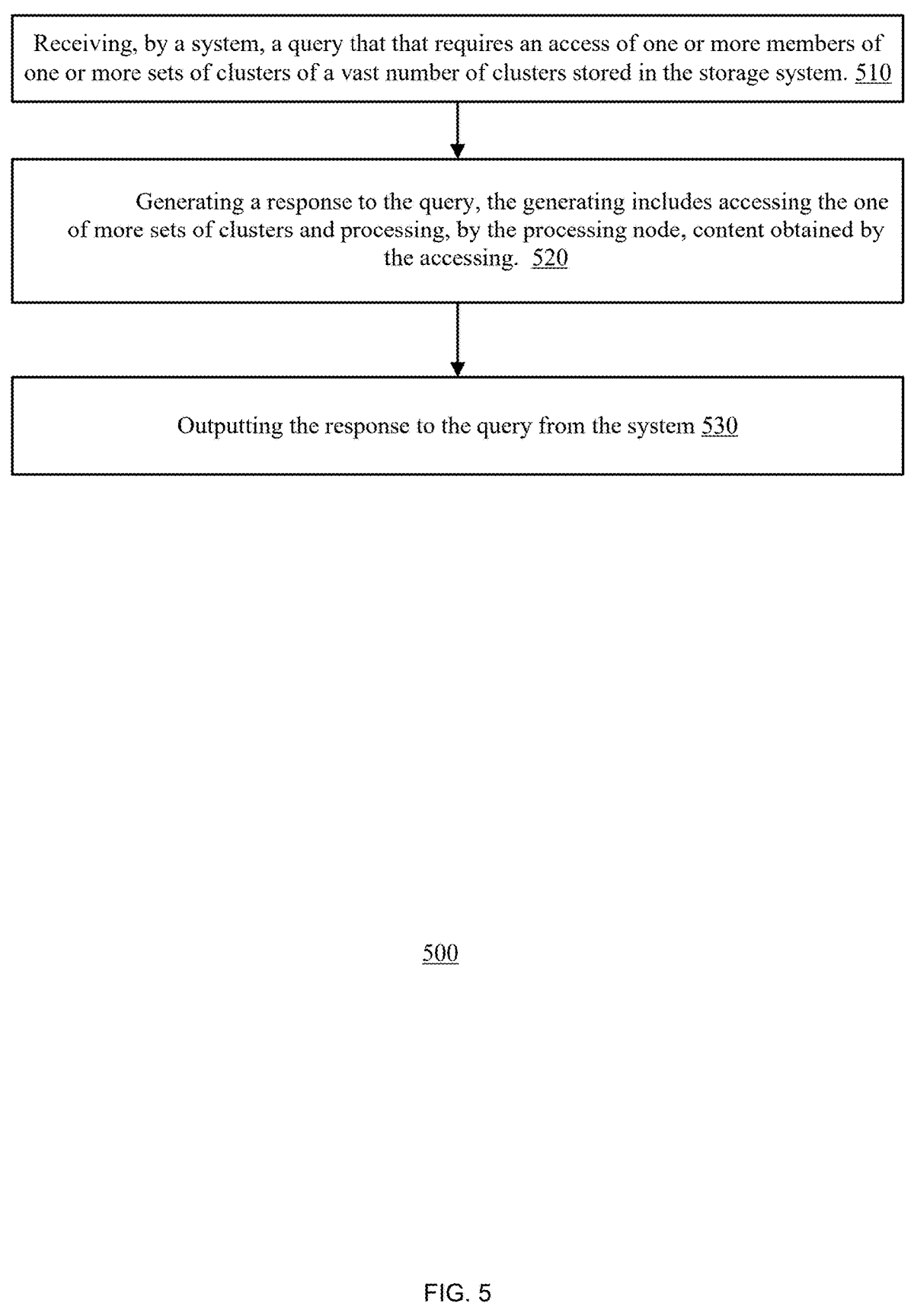

Receiving, by a system, a query that that requires an access of one or more members of one or more sets of clusters of a vast number of clusters stored in the storage system. 510

Generating a response to the query, the generating includes accessing the one of more sets of clusters and processing, by the processing node, content obtained by the accessing. 520

Outputting the response to the query from the system 530

CLUSTERING IN A STORAGE SYSTEM

BACKGROUND

A storage system is required to store a vast amount of information items and to support changes to the vast amount of information very quickly and effectively.

Clustering is a common way to maintain information items that are presumed to be linked to each other. In general, the clustering is based on distances between information items.

The information items may change over time as well as being deleted or having new information items received by the storage system.

The vast amount of information, when clustered may include millions of clusters, each cluster may include millions of members.

Distance based clustering may be resource consuming.

SUMMARY

There may be provided a method, a system, and a non-transitory computer readable medium as illustrated in the application.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

FIG. 3 is an example of a method;

FIG. 4 is an example of a method;

FIG. 5 is an example of a storage system; and

DETAILED DESCRIPTION OF THE DRAWINGS

Figure 1:
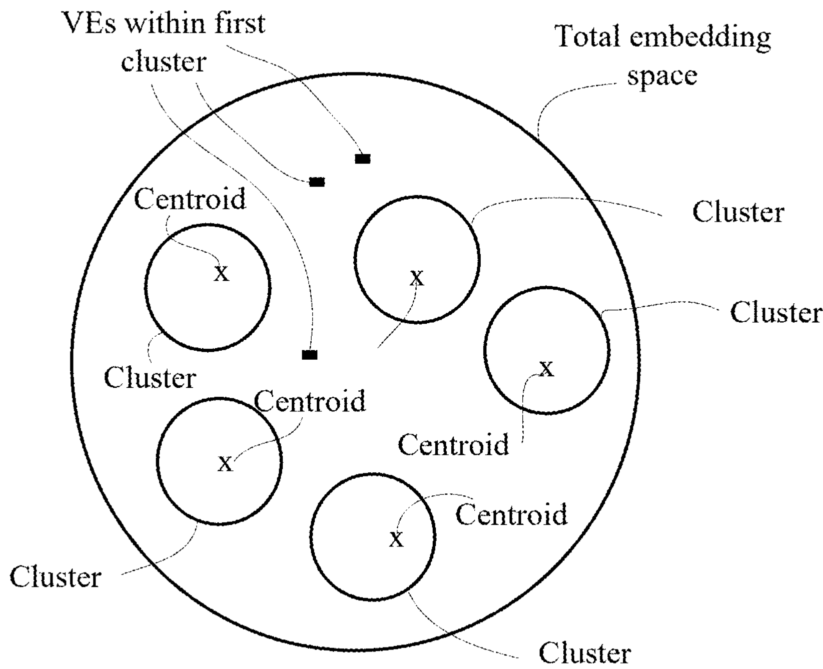
FIG. 1 is an example of clusters.

Text Embeddings is a technique widely used in Natural Language Processing (NLP) where elements such as text elements are essentially transformed into long vectors (typically of a few thousand vector elements) where a distance (for example, a Euclid distance) between the vectors is strongly related to a proximity in the underlying meaning of the elements. In the case of textual elements, the distance between two vectors is related to the absolute meaning or the contextual meaning of the textual elements. These vectors are often referred to as Vector Embeddings (VE) or just embeddings. The vector embeddings are stored in a vector embedding database—also referred to as vector DB. One can consider a pair of VEs with proximity (such as Euclidian proximity) to be neighbors. Different applications, such as NLP applications, often use this distance between such VEs in order to find close neighbors—a process which helps the application "understand" an input query and formulate an answer accordingly.

For this process of finding neighbors to be efficient and fast, some measures are usually taken. One is to store neighboring VEs physically close to each other within the data storage, accelerating the application's ability to retrieve neighboring VEs to find such a neighbor. Another measure is to cluster neighboring VEs together and index them in such a way that when the application receives a query, it can quickly attempt to search for VEs which are close to the query. A cluster is basically a data structure that has information about the VEs that are associated with it and some additional metadata such as the centroid of the associated VEs, the time of the creation and any other metadata regarding its characteristics.

Clustering techniques are well known and documented and include, for example, k-means clustering, hierarchical clustering and two-step clustering.

Occasionally, new data enters the system and new VEs are created accordingly. In other cases, data may change or be deleted, and the respective VEs are also changed or deleted. It is necessary to be able to perform re-clustering of the VEs in an efficient manner. Note that the number of VEs in a system may be in the trillions. The number of clusters may be in the millions and the number of VEs within a cluster may also be in the millions. Therefore, it is not efficient to perform re-clustering of the entire VE data set. There is a need for a novel method to re-cluster the VEs in an efficient manner Consider the following system or sub-system as an example for managing data, VEs and queries.

For a possible implementation, the system may be configured so that for a cluster there is a maximum number of associated VEs (MaxVE). For example, this number may be equal to 1 million VEs.

Whenever new data arrives, it is stored, and its respective VE is calculated. The VE, as mentioned, is a many-element vector. The space which can be spanned by these vectors is the VE space. Within the VE space, the new VE is added to a Landing Cluster (LC). A LC is just a cluster as defined above which has only newly added VEs associated with it. Whenever the number of VEs within the LC reaches MaxVE, then the first MaxVE VEs that arrived in the LC are extracted from it and are considered to belong to a Regular Cluster (RC). A RC is a cluster as defined above that has no newly added VEs associated with it.

For each RC, a centroid is calculated when the cluster is created. Each RC may then go through a process of sub-clustering. For example, a RC which has a MaxVE associated VEs, may be sub-clustered to 4000 sub-clusters, each containing 250 VEs. This process may be further repeated to create sub-clusters of the sub-clusters.

FIG. 1 is an example of a total embedding space 10 that includes clusters having centroids.

Figure 2:
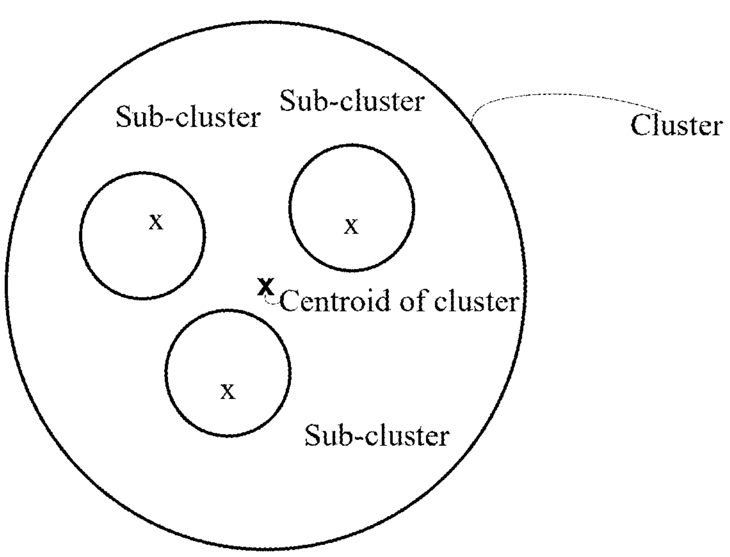
FIG. 2 is an example of a cluster.

FIG. 2 is an example of one of the clusters of FIG. 1—whereas the cluster includes multiple sub-clusters having sub-cluster centroids.

If data is modified or deleted, its associated VE, associated with a cluster is modified accordingly or deleted respectively. If this VE is associated with a RC, then the centroid of the RC associated with this VE is re-calculated. If the RC was sub-clustered, then a new centroid for the relevant sub-culture is also calculated. Note that if some data and the associated VE are deleted, the respective RC would now have less than MaxVE associated VEs.

Query Process Example

A query arrives in the form of a prompt to the application. Typically, the query itself is in the form of text. The query is transformed by the application to a VE (denoted here as Query VE, QVE). The system then attempts to find VEs which are neighbors of the QVE. The system may attempt to find all the neighbors with a distance smaller than some predefined distance from the QVE. Alternatively, the system may attempt to find the M closest neighbors without limiting the distance between them and the QVE. Alternatively, the system may attempt to find any other possible grouping of neighbors. This is performed in the following way:

a. The system calculates the distance between all the VEs in the LC and the QVE.
b. The system calculates the distance between the QVE and all the RC centroids.
c. RCs whose centroids satisfy the neighboring conditions, such as those conditions mentioned above, may be considered to hold VEs that are relevant neighbors to the QVE.

These are Candidate RCs (CRC).

a. If a CRC is not composed of sub-clusters, the system calculates the distances from all the VEs in that RC and the QVE
b. If a CRC is composed of sub-clusters, the system calculates the distances between the sub-cluster centroids and the QVE. Sub-clusters whose centroids satisfy the neighboring conditions, such as those conditions mentioned above may be considered to hold VEs that are relevant neighbors to the QVE and then the system measures the distances between the VEs associated with these sub-clusters and the QVE.

The system chooses from the VEs whose distance from the QVE was measured, those VEs that satisfy the condition as mentioned above and they are then used by the NLP application. Note that the VEs are associated with data and there would exist some mechanism which would enable the application to find the respective data with which each VE is associated.

When new data is added or existing data is modified or deleted, this will be reflected in their respective VEs and would affect the clusters with which these VEs are associated. For example, modifying a VE would result in the location of the RC's centroid. Similarly, deleting a VE would also result in a change in the number of VEs associated with the RC.

Re-clustering the VEs, may lead to clusters whose centroids better reflect the new set of VEs that are now associated with the clusters. Re-clustering is generally performed in the following manner:

a. N RCs are selected for re-clustering. Let T be the total number of VEs associated with these N RCs.
b. The VEs associated with the N RCs are re-clustered into a new number of RCs (NeN) where: NeN=ceiling (T/MaxVE).
c. The new RCs then have their centroids calculated and if desired, go through a process of sub-clustering. As mentioned, sub-clusters can accelerate the process of finding neighbors.

It is necessary to have an efficient way of selecting the N RCs to be re-clustered. If they are selected inefficiently, then the group of all available RCs after the re-clustering may not facilitate finding neighbors of a QVE in an efficient manner.

One possible way to select the RCs to re-cluster is the following.

Each of the RCs is assigned a sparseness measure (S). This parameter can be calculated from the distances between the VEs within a cluster and that cluster's centroid. The calculation may depend on one of a variety of statistical measures such as: the mean distance of the VEs from the centroid, the median distance, the distance of the Xth most distant VE within the cluster from the cluster's centroid where X may represent any number within the number of VEs within the cluster or any percentile of those VEs, the average distance of the X closest VEs to the cluster's centroid, etc. This value may be calculated whenever the contents of a cluster changes by modifying or deleting an existing VE. A cluster with a high S value is a cluster whose centroid may not be a very good characterizer of the VEs associated with it.

Another parameter that is calculated is the distance between any two cluster centroids.

Then perform the following process.

Repeat X times:

a. Choose a random group G of N RCs
b. For each of the pairs of clusters selected, a re-clustering score (RCS) is calculated as a function based on the value S of both clusters and the distance between them. For example, the score for a pair of clusters C1 and C2 may be $$RCS = S(C1) + S(C2) - \text{distance}\ (C1, C2)$$

c. Associate the sum of all RCSs calculated to the group.

Select the group G which has the highest associated sum of RCS as the group of N RCs which are re-clustered The number X may depend on available resources, the time it takes to perform calculations etc.

In order to reduce the number of calculations to be performed, it is possible to limit the RCs considered in the above process based on their different characteristics. For example, it is possible to consider only those RCs that have S above some sparseness threshold. This would mean that RCs which are not very sparse would not be considered for re-clustering.

It is possible only to consider RCs based on the number of VEs associated with them. Another characteristic that may be considered is how recently a RC was created and whether or not this is a RC that was created by a re-clustering process or was created by extracting VEs from the LC.

Since choosing the X different group of N RCs is random, there may be some RCs that would not be selected for some time while others might be selected more often. Deciding not to consider those RCs which have been created more recently would increase the probability that all RCs would eventually be considered. These and other such characteristics may be considered separately or together when deciding if to consider a RC as a candidate for re-clustering.

Re-clustering may be performed periodically, or it can take different parameters into account such as the number of VEs within the RCs, or available resources, etc.

FIG. 3 illustrates an example of method 300 for clustering and re-clustering in a storage system.

According to an embodiment, method 300 includes step 310 of randomly selecting a first number of sets of clusters of a vast number of clusters stored in the storage system.

According to an embodiment, the vast number of clusters includes first clusters and second clusters.

Each first cluster is generated regardless of similarities between members of the first cluster. Thus—in contrary to known clustering processed that calculate distances between first cluster members and centroids of one or more clusters—the clustering of the first members may be seen as a temporary clustering—as a quick and dirty clustering process—that saves a lot of computational resources.

Each second cluster is generated based on at least similarities between members of the second cluster. The second clusters may be generated using prior art clustering methods such as k-means clustering, hierarchical clustering or two-step clustering.

According to an embodiment, step 310 is followed by step 320 of calculating, for each set of clusters, by a processing circuit, a set re-clustering score that is based on (i) a sparseness measure of each clusters of the set of clusters, and (ii) one or more inter-clusters relationship measure indicative of spatial relationships between the clusters of the set of clusters.

According to an embodiment, the sparseness measure is calculated from the distances between the VEs within a cluster and that cluster's centroid. The calculation may depend on one of a variety of statistical measures such as: the mean distance of the VEs from the centroid, the median distance, the distance of the Xth most distant VE within the cluster from the cluster's centroid where X may represent any number within the number of VEs within the cluster or any percentile of those VEs, the average distance of the X closest VEs to the cluster's centroid, etc. This value may be calculated whenever the contents of a cluster changes by modifying or deleting an existing VE. A cluster with a high S value is a cluster whose centroid may not be a very good characterizer of the VEs associated with it.

According to an embodiment, step 320 is followed by step 330 of identifying, by the processing circuit and based on set re-clustering scores of the first number of sets of clusters, one or more sets of clusters to be re-clustered.

According to an embodiment, step 330 is followed by step 340 of re-clustering each one or more sets of clusters to provide updated second clusters.

According to an embodiment, step 340 is followed by step 350 of responding to the re-clustering.

According to an embodiment, the responding includes storing the updated second clusters in storage nodes of the storage system—especially storing in non-volatile memory units of the storage nodes.

According to an embodiment, method 300 includes step 305 of generating the first clusters.

According to an embodiment, step 305 includes generating the first clusters without executing prior art clustering method such as k-means clustering, hierarchical clustering or two-step clustering.

According to an embodiment, step 305 includes generating the first clusters without executing similarity calculations regarding the members of the first clusters.

According to an embodiment, step 305 includes generating each first cluster based solely on a time of arrival of members of the first cluster and a size parameter related to the first cluster. The size parameter provides a minimal or maximal number of members per cluster.

According to an embodiment, each inter-clusters relationship measure is indicative of distances between centroids of clusters of the set of clusters.

According to an embodiment, the first number of sets are selected out of a plurality of clusters of the vast number of clusters that exhibit a sparseness that exceeds a sparseness threshold.

According to an embodiment, the first number of sets are selected out of a plurality of clusters of the vast number of clusters that have undergone less than a defined number of re-clustering operations.

According to an embodiment, method 300 includes step 360 of receiving indications regarding one or more change in one or more members of a second cluster and recalculating a sparseness measure and recalculating a centroid of the second cluster following the one or more changes.

According to an embodiment, the members of the first cluster and the members of the second cluster are embeddings.

FIG. 4 illustrates an example of method 380 for clustering and re-clustering in a storage system.

Method 380 includes various processes that may be executed in parallel to each other.

The first process includes step 311 of receiving vector embeddings. Step 311 may be repeated multiple times. Additionally step 311 is followed by step 312 of generating first clusters by a first process 312—for example a first process that is indifferent to similarities between members of the first cluster.

The second process includes step 313 of generating second clusters by a second process 313. Step 313 may be repeated multiple times. Step 313 is applied on first clusters only.

The third process includes step 315 of re-clustering. The re-clustering may be applied on both first and second clusters. See, for example, step 340 that is applied on set of clusters that may include first and second clusters.

The outcome of method 380 is clusters such as first clusters 371, second clusters 372 and updated clusters 373.

The repetitions of methods 300 and/or 380 and the random selection will eventually guarantee that each first cluster is converted to a second cluster and/or a updated cluster—that apply similarity based clustering.

FIG. 5 illustrates an example of method 500 for responding to a query.

According to an embodiment, method 500 includes step 510 of receiving, by a processing node of a system such as a storage system, a computerized system, a natural language processing (NLP) system, a query that that requires an access to one or more members of one or more sets of clusters of a vast number of clusters stored in the storage system.

According to an embodiment, step 510 is followed by step 520 of generating a response to the query, the generating includes accessing the one of more sets of clusters and processing, by the processing node, content obtained by the accessing.

According to an embodiment, step 520 is followed by step 530 of outputting the response to the query from the system.

Figure 6:
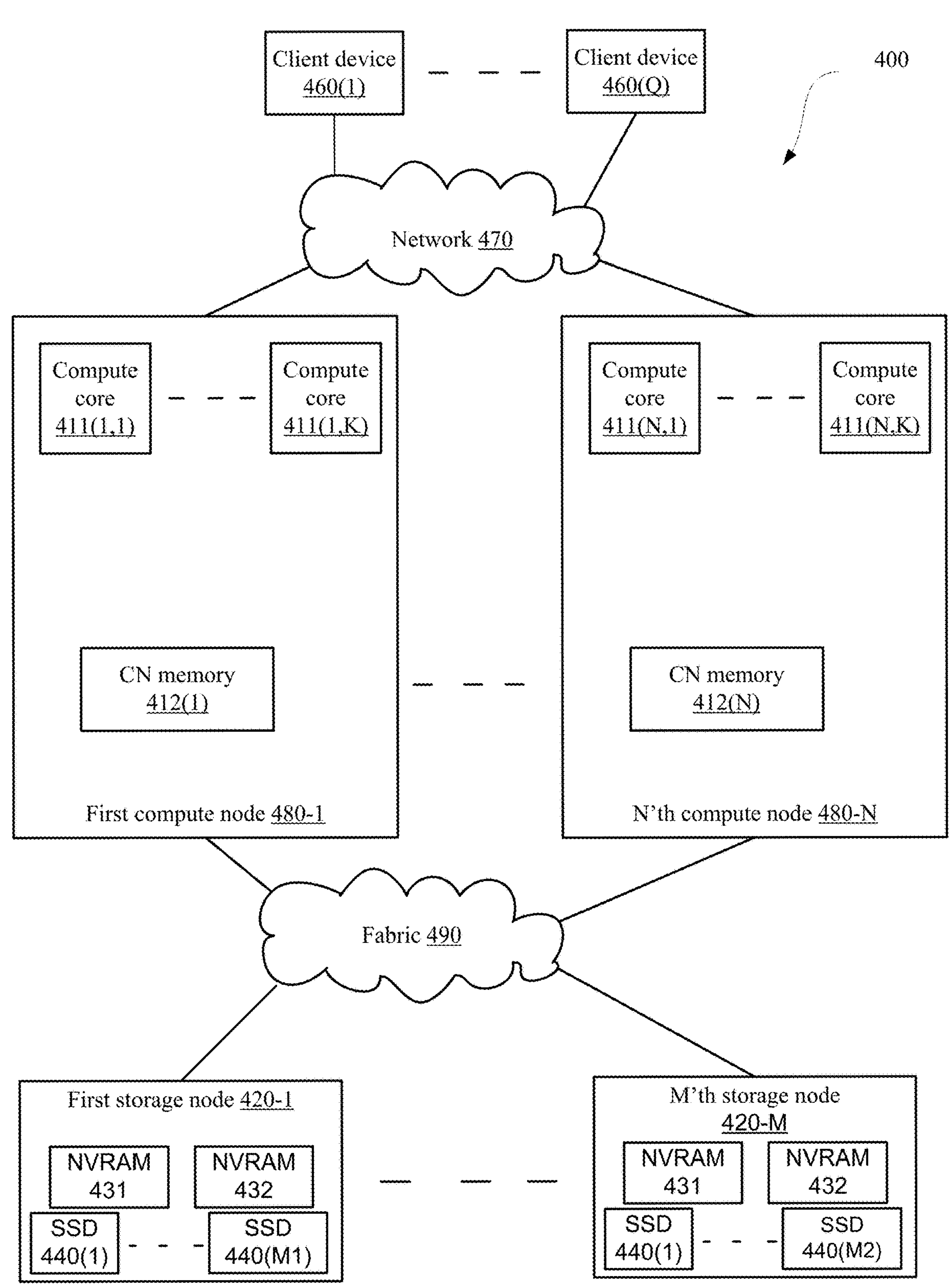
FIG. 6 shows an example of a storage system.

FIG. 6 shows an example diagram of a storage system 400 for managing a partially ordered database. The storage system 400 includes N compute nodes—from first compute node 480-1 through the N'th compute node 480-N.

Each compute nodes includes multiple compute cores each—see for example compute cores 411(1,1)-411(1,K) of first compute node 480-1 and compute cores 411(N,1)-411(N,K) of N'th compute node 480-N.

At least a part of the compute node memory is a random access memory—being a volatile RAM or a non-volatile RAM.

According to an embodiment, each compute core is a processing circuit, a part of processing circuit, and the like. A compute node may include at least one of a clustering circuit, re-clustering circuit, query response circuit, and the like—for example one or more of compute cores 411(N,1)-411(N,K) is at least one of a clustering circuit, re-clustering circuit, query response circuit, and the like.

According to an embodiment, each compute node includes a compute node (CN) memory such as CN memory 412(1) of first compute node till CN memory 412(N) of the N'th compute node.

A processing circuit may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Each compute node 480 interfaces with one or more client devices such as a client devices 460(1)-460(Q) (or an application installed therein) via a network 470, for receiving queries and for sending responses to the queries.

The storage system 400 also includes M storage nodes 420-1 through 420-M. The compute nodes and the storage nodes communicate using communication fabric 490. M may equal N or may differ from N.

The storage nodes 420 provide the storage and state in the system 400. Each storage node 420 may include a plurality of SSDs, such as SSDs 440, for example storage node 420-1 includes M1 SSDs 440(1)-440(M1). The storage nodes store the partially ordered database in one or more of the storage devices (units).

Any reference to "may be" should also refer to "may not be".

In the foregoing detailed description, numerous specific details are set forth to provide a thorough understanding of the one or more embodiments of the disclosure. However, it will be understood by those skilled in the art that the present one or more embodiments of the disclosure may be practiced without these specific details. In other instances, well-known methods, procedures, and components have not been described in detail so as not to obscure the present one or more embodiments of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present one or more embodiments of the disclosure and in order not to obfuscate or distract from the teachings of the present one or more embodiments of the disclosure.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks, circuit elements, or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather, the scope of the embodiments of the disclosure is defined by the appended claims and equivalents thereof.

We claim:

1. A method for clustering and re-clustering in a storage system, the method comprises:

generating, by one or more processing circuits of one or more compute nodes of the storage system, first clusters without executing similarity calculations regarding the members of the first clusters;

randomly selecting, by the one or more processing circuits, a first number of sets of clusters of a plurality of clusters of a millions of clusters stored in the storage system, the plurality of clusters exhibit a spareness measure that exceeds a sparseness threshold; wherein the millions of clusters comprises the first clusters and second clusters, wherein each second cluster is generated based on at least similarities between members of the second cluster;

for each set of clusters, calculating by the one or more processing circuits, a set re-clustering score that is based on (i) sparseness measure of each cluster of the set of clusters, and (ii) one or more inter-clusters relationship measure indicative of spatial relationships between the clusters of the set of clusters;

identifying, by the one or more processing circuits and based on set re-clustering scores of the first number of sets of clusters, one or more sets of clusters to be re-clustered;

re-clustering, by the one or more processing circuits, each one of the one or more sets of clusters to provide updated second clusters; and storing the updated second clusters in non-volatile memory units of the storage system.

2. The method according to claim 1, wherein members of each updated second cluster are neighboring embeddings that are indexed for retrieval of embeddings that are close to a neural language processing query embedding.

3. The method according to claim 1 wherein the generating of the first clusters comprises generating each first cluster based solely on a time of arrival of members of the first cluster and a size parameter related to the first cluster.

4. The method according to claim 1, wherein each inter-clusters relationship measure is indicative of distances between centroids of clusters of the set of clusters.

5. The method according to claim 1, wherein the compute node is one of multiple compute nodes of the storage system, wherein the non-volatile memory units belong to one or more storage nodes out of multiple storage nodes of the storage system, wherein the multiple storage nodes and the multiple compute nodes communicate using a communication fabric of the storage system.

6. The method according to claim 1, further comprising receiving a query accessing one or more clusters of the millions of clusters to provide content; generating a response to the query; and outputting the response.

7. The method according to claim 1, comprising receiving indications regarding one or more change in one or more members of a second cluster and recalculating a sparseness measure and recalculating a centroid of the second cluster following the one or more changes.

8. The method according to claim 1, comprising repeating the method until each first cluster is converted to a second cluster or an updated second cluster.

9. A non-transitory computer readable medium for clustering and re-clustering in a storage system, the non-transitory computer readable medium stores instructions executable by a processing system for:

generating, by one or more processing circuits of one or mor compute nodes of the storage system, first clusters without executing similarity calculations regarding the members of the first clusters;

randomly selecting, by the one or more processing circuits, a first number of sets of clusters of a plurality of clusters of a millions of clusters stored in the storage system, the plurality of clusters exhibit a spareness measure that exceeds a sparseness threshold; wherein the millions of clusters comprises second clusters and some of the first clusters, wherein each second cluster is generated based on at least similarities between members of the second cluster;

for each set of clusters, calculating by the one or more a processing circuits, a set re-clustering score that is based on (i) a sparseness measure of each cluster of the set of clusters, and (ii) one or more inter-clusters relationship measure indicative of spatial relationships between the clusters of the set of clusters;

identifying, by the one or more ss g circuits and based on set re-clustering scores of the first number of sets of clusters, one or more sets of clusters to be re-clustered; and re-clustering, by the one or more processing circuits, each one or more sets of clusters to provide updated second clusters; and storing the updated second clusters in non-volatile memory units of the storage system.

10. The non-transitory computer readable medium according to claim 9, wherein members of each updated second cluster are neighboring embeddings that are indexed for retrieval of embeddings that are close to a neural language processing query embedding.

11. The non-transitory computer readable medium according to claim 9, wherein the generating of the first clusters comprises generating each first cluster based solely on a time of arrival of members of the first cluster and a size parameter related to the first cluster.

12. The non-transitory computer readable medium according to claim 9, wherein each inter-clusters relationship measure is indicative of distances between centroids of clusters of the set of clusters.

13. The non-transitory computer readable medium according to claim 9, wherein the compute node is one of multiple compute nodes of the storage system, wherein the non-volatile memory units belong to one or more storage nodes out of multiple storage nodes of the storage system, wherein the multiple storage nodes and the multiple compute nodes communicate using a communication fabric of the storage system.

14. The non-transitory computer readable medium according to claim 9, wherein compute node is one of multiple compute nodes of the storage system, wherein the non-volatile memory units belong to one or more storage nodes out of multiple storage nodes of the storage system, wherein the multiple storage nodes and the multiple compute nodes communicate using a communication fabric of the storage system.

15. The non-transitory computer readable medium according to claim 9, wherein the non-transitory computer readable medium stores instructions executable by the processing system for, further comprising receiving a query, accessing one or more clusters of the millions of clusters to provide content; generating a response to the query; and outputting the response.

16. The non-transitory computer readable medium according to claim 9, comprising repeating the method until each first cluster is converted to a second cluster or an updated second cluster.

* * * * *